L. BROWN.
Device for Confining Cows while being Milked.
No. 59,550. Patented Nov. 13, 1866.
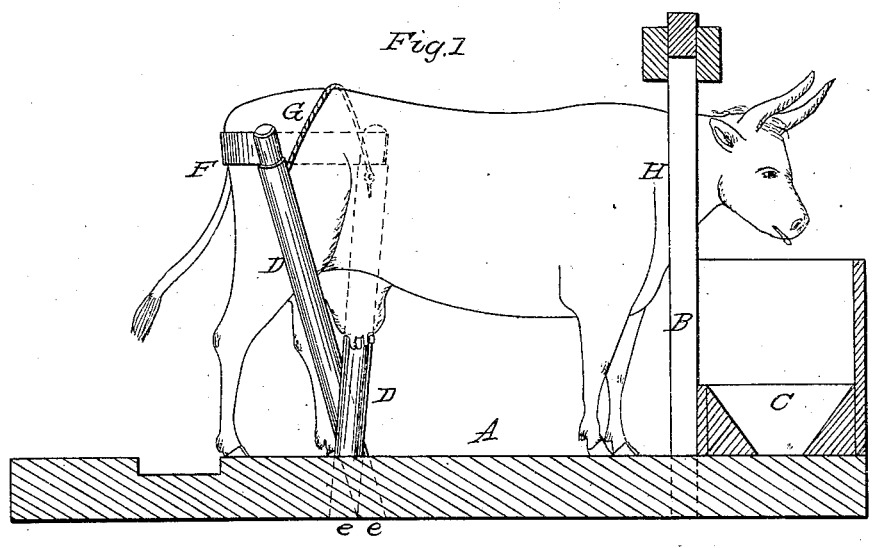
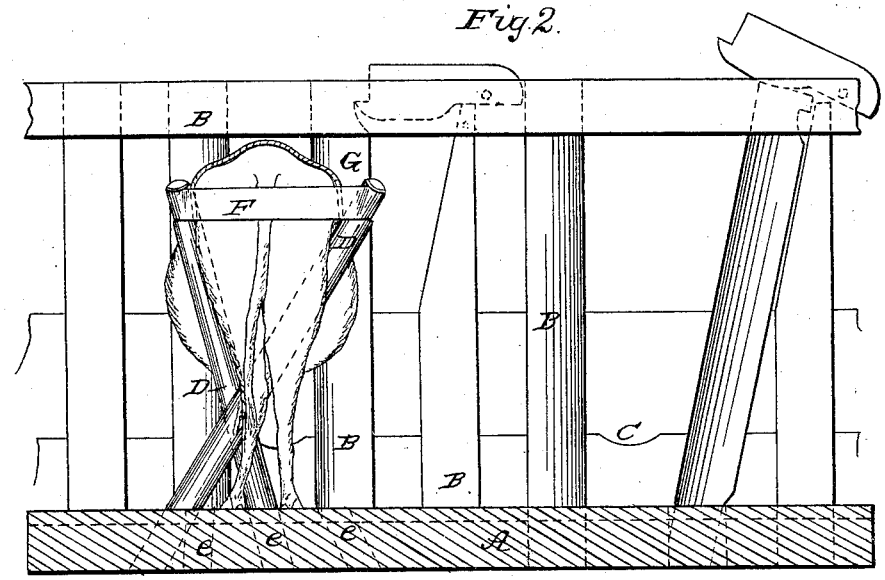
Witnesses
B. H. Muchle
S. P. Campbell
Inventor
Levi Brown

UNITED STATES PATENT OFFICE.

LEVI BROWN, OF EVANS, NEW YORK.

DEVICE FOR CONFINING COWS WHILE BEING MILKED.

Specification forming part of Letters Patent No. 59,550, dated November 13, 1866.

*To all whom it may concern:*

Be it known that I, LEVI BROWN, of the town of Evans, (Angola P. O.,) Erie county, and State of New York, have invented a new and improved device for the management of restless and kicking cows while they are being milked, which I call a "Cow-Tamer;" and I do hereby declare that the following is a full and exact description of the construction and manner of using the same, having reference to the accompanying drawings, making a part of this specification, in which—

Figure I is a side elevation. Fig. II is a rear elevation.

The nature of this invention relates to placing two stakes in holes bored in the stable or stall floor, where the cow is put for milking, in such manner that one stake shall pass up on the off side of the cow, and the other shall pass under the cow at an angle and project on the right side, just forward of the right hind leg, so as to bring the cow's bag and teats forward of the stake, as shown in Fig. I, having a strap reaching from stake to stake in rear of the cow and a rope or strap passing over the cow's rump from stake to stake.

Letters of like name and kind refer to like parts in each of the figures.

A represents a stable or stall floor where cows are kept and housed, and B a stanchion, and C a feed box or trough. All these parts may be of common construction, although I have made an improvement in locking the stanchion and in the form of the feed-box, for which I propose to apply for a patent hereafter; but in this specification my invention relates to a device for the management of restless or disorderly cows in milking.

D and D' represent two stakes, which are placed in suitable holes made in the stable or stall floor. The stake D is set nearly vertical. It may or may not incline. A slight inclination is preferable. The stake D' is set at a greater angle, so that it will pass under the cow, crossing the stake D, and projecting at the right side of the cow, forward of her hind legs, as shown in the drawings. Several holes e (more or less) are bored in the stable or stall floor to receive the ends of the stakes, so that the stakes may be set in such holes as will be adapted to cows of different sizes and temper.

F represents a leather strap, which may be looped so as to fasten on the top of the stakes, as shown, and pass in rear of the cow, to prevent her from stepping backward while being milked.

G represents a strap or rope, which is passed over the cow's back or rump, and made fast to the stakes, to prevent the cow from rearing or stepping over the inclined stake D'. This will not be required except in cases of very disorderly cows.

It is common to milk cows in the stable or stall where they are housed and fed.

In the practical application of my improvement I place a disorderly cow in the stable or stall with her head locked in the stanchion B, as represented at H in the drawings. I then place the stake D in a proper hole in the floor, so that it will project upwardly on the left side of the cow, or this stake may be placed before the cow is put into the stall. I then put the stake D' under the cow, the end of the stake passing into a suitable hole in the floor, so that it will project on the right side of the cow, just forward of the hind legs, and so that the bag and teats will be forward of the stake, as shown in Fig. I. I then adjust and fasten the strap F (a buckle may be used on the strap) and the rope G, (either one or both,) and the cow is then restrained in such a position that she can be milked without the least danger from disorderly conduct. She is, in fact, so much restrained that she can neither kick nor frisk nor step to prevent a safe and expeditious milking.

This invention is very cheap and simple in construction, and yet it answers the purpose for which it is designed most effectually.

What I claim as my invention is—

The stakes D and D', placed and supported in suitable holes in the stable or stall floor, with or without the strap F and rope G, for the purpose and substantially as described.

LEVI BROWN.

Witnesses:
B. H. MUEHLE,
F. A. LANGWORTHY.